(12) United States Patent
Hancock, Jr. et al.

(10) Patent No.: US 12,005,828 B2
(45) Date of Patent: *Jun. 11, 2024

(54) TRAILER-MOUNTED METERED PUMPING SYSTEM

(71) Applicant: Western Transport Logistics, Inc., Phoenix, AZ (US)

(72) Inventors: Douglas L. Hancock, Jr., Mesa, AZ (US); Jacob R. Pew, Scottsdale, AZ (US)

(73) Assignee: Western Transport Logistics, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,475

(22) Filed: May 9, 2022

(65) Prior Publication Data

US 2022/0258661 A1 Aug. 18, 2022

Related U.S. Application Data

(63) Continuation of application No. 16/507,429, filed on Jul. 10, 2019, now Pat. No. 11,414,004.

(51) Int. Cl.
| | |
|---|---|
| *B67D 7/16* | (2010.01) |
| *B60P 3/22* | (2006.01) |
| *B65B 1/04* | (2006.01) |
| *F04B 13/00* | (2006.01) |
| *F04B 17/06* | (2006.01) |
| *F04B 23/02* | (2006.01) |

(52) U.S. Cl.
CPC .............. *B60P 3/225* (2013.01); *B60P 3/228* (2013.01); *B65B 1/04* (2013.01); *B67D 7/16* (2013.01); *F04B 13/00* (2013.01); *F04B 17/06* (2013.01); *F04B 23/02* (2013.01)

(58) Field of Classification Search
CPC ............. B67D 7/16; B60P 3/225; B60P 3/228
See application file for complete search history.

(56) References Cited

U.S. PATENT DOCUMENTS

| | | | | |
|---|---|---|---|---|
| 6,612,591 | B1* | 9/2003 | Watanabe | F02B 63/04 |
| | | | | 280/4 |
| 11,414,004 | B2* | 8/2022 | Hancock, Jr. | F04B 17/06 |
| 2007/0116546 | A1* | 5/2007 | Dearing | B60P 3/228 |
| | | | | 414/482 |
| 2017/0267513 | A1* | 9/2017 | Kittoe | B67D 7/40 |

* cited by examiner

*Primary Examiner* — Jason K Niesz
(74) *Attorney, Agent, or Firm* — Snell & Wilmer L.L.P.

(57) ABSTRACT

A trailer-mounted pumping system includes a flatbed trailer having a generally flat deck surface, a pump, a batch controller, and a metering device in electronic communication with the batch controller, wherein the pump is configured to move a liquid from at least one tote supported by the generally flat deck surface to a location off-board the flatbed trailer, and the batch controller is configured to measure a volume of the liquid via the metering device. The pump, the metering device, and/or the batch controller may be disposed beneath the generally flat deck surface.

9 Claims, 5 Drawing Sheets

TRAILER-MOUNTED METERED PUMPING SYSTEM

CROSS-REFERENCE TO RELATED APPLICATIONS

This application is a continuation of U.S. Ser. No. 16/507,429 filed on Jul. 10, 2019, now U.S. Patent Application Publication No. 2021-0010465 entitled "Trailer-Mounted Metered Pumping System." The contents of the foregoing application are incorporated herein by reference, including but not limited to those portions that specifically appear hereinafter, but except for any subject matter disclaimers or disavowals, and except to the extent that the incorporated material is inconsistent with the express disclosure herein, in which case the language in this disclosure shall control.

FIELD

The present disclosure relates generally to tractor-trailers, and, more specifically, to a pumping system for tractor-trailers.

BACKGROUND

Delivery of bulk liquids is typically performed using semi-trucks which generally incorporate single or multi-compartment tanker trailers configured to carry only liquids. In order to load a liquid into a tanker trailer, a liquid is pumped via a hose into one or more compartments of the tanker trailer. When loading multiple types of liquids, the hose is typically washed out when switching between different types of liquids, or separate hoses are used, in order to prevent cross-contamination of liquids. After delivery, unpumped product is typically pumped back into bulk tanks and the compartments are rinsed out in preparation for the next delivery. A considerable amount of time is used between loading compartments, unloading compartments, and rinsing the compartments in preparation for each load.

SUMMARY

A trailer-mounted pumping system is disclosed, comprising a flatbed trailer having a generally flat deck surface, a pump, a batch controller, and a metering device in electronic communication with the batch controller, wherein the pump is configured to move a liquid from at least one tote supported by the generally flat deck surface to a location off-board the flatbed trailer, and the batch controller is configured to measure a volume of the liquid via the metering device.

In various embodiments, the pump, the batch controller, and/or the metering device is disposed beneath the generally flat deck surface.

In various embodiments, the trailer-mounted pumping system comprises one or more housings wherein one or more components of the pumping system is stored.

In various embodiments, the trailer-mounted pumping system further comprises a first housing mounted beneath the deck surface, wherein the batch controller and the metering device are disposed in the first housing.

In various embodiments, the trailer-mounted pumping system further comprises a second housing mounted beneath the deck surface, wherein the pump is disposed in the second housing.

In various embodiments, the trailer-mounted pumping system further comprises a power converter configured to supply electric power to the batch controller and the metering device.

In various embodiments, the power converter receives the electric power from a trailer auxiliary power line.

In various embodiments, the power converter is disposed in the first housing.

In various embodiments, the trailer-mounted pumping system further comprises a printer in electronic communication with the batch controller, wherein the printer is configured to print a report of the volume of the liquid.

In various embodiments, the printer is disposed in the first housing.

In various embodiments, the trailer-mounted pumping system further comprises a heating element mounted to the second housing, the heating element is configured to radiate thermal energy to the pump.

In various embodiments, the trailer-mounted pumping system further comprises a cross-over pipe mounted to the flatbed trailer, wherein the cross-over pipe extends transversely across the flatbed trailer to provide a fluid path between a first side of the flatbed trailer and a second side of the flatbed trailer, the cross-over pipe is configured to be coupled between the pump and at least one tote.

A method for delivering a liquid is disclosed, comprising loading at least one tote containing a liquid onto a generally flat deck surface of a flatbed trailer, and dispensing the liquid from the tote using a trailer-mounted pumping system. The trailer-mounted pumping system comprises a pump disposed beneath the generally flat deck surface, a batch controller disposed beneath the generally flat deck surface, and a metering device in electronic communication with the batch controller, the metering device disposed beneath the generally flat deck surface, wherein the pump is configured to move the liquid from the at least one tote supported by the generally flat deck surface to a location off-board the flatbed trailer, and the batch controller is configured to measure a volume of the liquid via the metering device.

In various embodiments, the method further comprises printing a report of the volume of the liquid, wherein the trailer-mounted pumping system further comprises a printer in electronic communication with the batch controller.

In various embodiments, the method further comprises connecting a first conduit between the at least one tote and the pump.

In various embodiments, the method further comprises connecting a second conduit between the pump and the metering device.

In various embodiments, the method further comprises unloading the least one tote from the flatbed trailer.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be example in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

Figure 1:
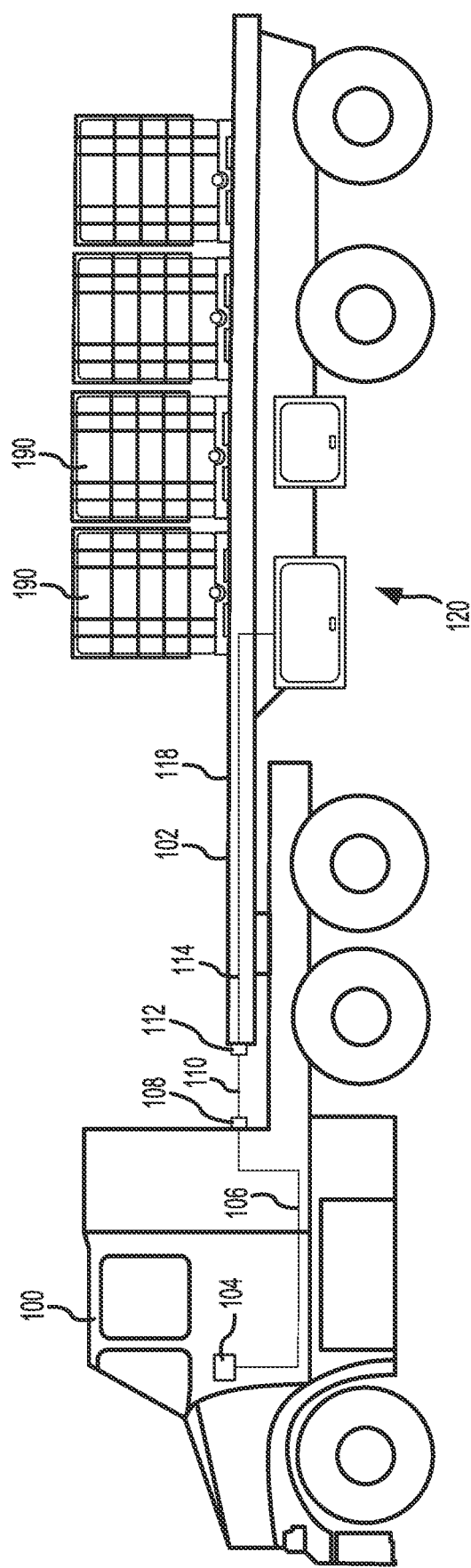
- FIG. 1 illustrates a schematic view of a trailer-mounted pumping system and associated power system, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

In accordance with example embodiments, a pumping system of the present disclosure is mounted underneath a deck surface of a flatbed trailer, clearing up deck space to allow for maximal cargo space on the trailer. Unlike tank trucks which generally incorporate single or multi-compartment tanks configured to carry only liquids, a flatbed trailer may be used to carry various types of cargo, including solids and liquids, among others. In addition to a larger variety of products that may be hauled per load, a flatbed trailer of the present disclosure is manufactured from a lightweight metal, such as aluminum for example, which increases the number of gallons hauled per load, increasing overall productivity.

As used herein, the term "flatbed trailer" also includes step deck trailers, the deck of which generally incorporate a lowered portion to accommodate for a taller cargo height, as well as a standard height portion. In this regard, it is contemplated that the pumping system of the present disclosure may be used with flatbed trailers or step deck trailers, without departing from the spirit and scope of the disclosure.

As used herein, the term "on-board" refers to a location on or in a vehicle, such as a tractor and/or trailer. As used herein, the term "off-board" refers to a location that is not on-board the vehicle—e.g., a location that is not on or in the vehicle.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In this regard, "electronic communication," as used herein, includes wired and wireless communications (e.g., Bluetooth, TCP/IP, Wi-Fi, etc.).

An example pumping system equipped tractor and a trailer, with example intermediate bulk containers (IBCs), also referred to herein as totes, loaded on the trailer deck, is described with reference to FIG. 1 in accordance with an embodiment of the present disclosure. As used herein, the term "tractor" may refer to any vehicle having another vehicle in tow. An example electrical power supply for the pumping system is described with reference to FIG. 1, in accordance with various embodiments. It will be appreciated that the electrical system configuration may vary among manufacturers and models of tractors and trailers. The pumping system of the present disclosure may be incorporated in new tractor-trailer systems or may be retrofitted in existing tractor-trailers.

DC power originating with a tractor ignition system may be distributed to various components and subsystems of tractor 100 and trailer 102 through a Power Distribution Module (PDM) 104. As used herein, PDM 104 comprises any hardware and/or software suitably configured to facilitate the provisioning of electric power to any number of DC-powered components located on both the tractor 100 and on the trailer 102. It will be appreciated that the positioning and configuration of PDM 104 may vary among makes and models of tractors and that some configurations may include more than one PDM 104.

To distribute power to various components and subsystems of trailer 102, DC power is routed from PDM 104 to a tractor power point 108 by way of an auxiliary power line 106. In various embodiments, tractor power point 108 and trailer power point 112 comprise any hardware suitably configured to receive an umbilical 110 connector. Tractor power point 108 and/or trailer power point 112 may be of various configurations, including but not limited to a SAE J560 seven-way connector.

From tractor power point 108, auxiliary power and/or data may be passed to and from the trailer power point 112 by way of umbilical 110. In various embodiments, umbilical 110 comprises any hardware suitably configured to carry electric current and/or data between tractor power point 108 and a corresponding trailer power point 112. In accordance with various embodiments, umbilical 110 is a seven wire jacketed cable with a SAE J560 seven-way connector attached to each end.

Auxiliary power is dispersed to one or more trailer 102 components and/or subsystems through one or more trailer auxiliary power lines 114. Auxiliary powered components and subsystems include pumping system 120. Further auxiliary powered components and subsystems may include, for example, turn signals, brake lamps, tail lamps, side marking lamps, and clearance lamps.

The illustrated embodiment shows a flatbed trailer (i.e., trailer 102) which includes a generally flat deck surface 118 upon which various components may be loaded for transport. Pumping system 120 can be mounted underneath the deck surface 118, clearing up deck space to allow for maximal cargo space. It is contemplated herein, however, that pumping system 120 can be mounted level with, or on top of, deck surface 118. For example, pumping system 120 may be mounted at the front or rear of trailer 102 on deck surface 118, or any other location of trailer 102 as desired. FIG. 1 illustrates a plurality of totes 190 loaded on the deck surface 118 of trailer 102. Because the totes 190 are hauled on the deck surface 118, other components may be hauled with the totes 190 and the totes 190 may be easily removed or added depending on the desired delivery. In this regard, trailer 102 may be configured to deliver solely liquids via the totes 190, a mixture of liquids and other types of cargo, or the totes 190 may be removed altogether to accomplish other deliveries as desired. For example, trailer 102 may be capable of carrying eighteen different totes 190, allowing for eighteen unique liquid products (e.g., concrete admixture, petroleum products) to be loaded onto trailer 102 simultaneously. More or less totes 190 may be carried depending on the size of trailer 102, among other factors. In addition to a larger variety of products that may be hauled per load, trailer 102 is manufactured from a lightweight metal, such as aluminum for example, which, along with its relatively simple and lightweight design, increases the number of gallons hauled per load, increasing overall productivity.

Figure 2:
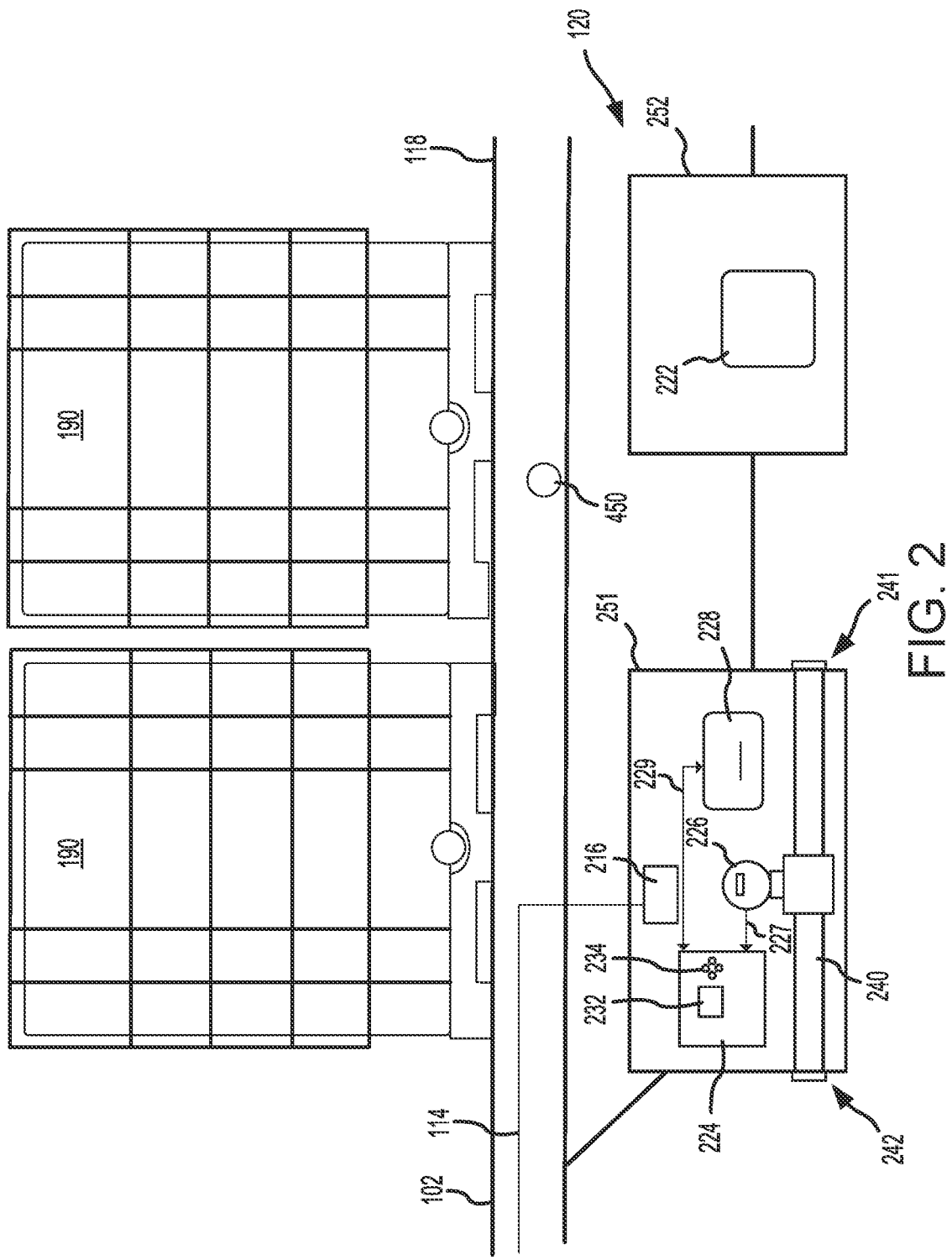
FIG. 2 illustrates an enlarged schematic view of the trailer-mounted pumping system of FIG. 1, in accordance with various embodiments.

With reference to FIG. 2, an enlarged schematic view of the pumping system 120 is illustrated, in accordance with various embodiments. In various embodiments, pumping system 120 includes a pump 222. Pump 222 may comprise any fluid pump suitable for pumping a liquid from totes 190 to an off-board container, include positive-displacement pumps and nonpositive-displacement pumps—e.g., centrifugal pumps. In various embodiments, pump 222 is a gas-powered pump. Stated differently, pump 222 may be operated via a gas-powered engine coupled together with the pump. In various embodiments, pump 222 is an electric pump. For example, pump 222 may be operated via an electric motor coupled together with the pump, and powered via trailer auxiliary power line 114. In various embodiments, pump 222 is a hydraulically-driven pump. For example, pump 222 may be operated via a hydraulic pump via a power take-off (PTO) system of tractor 100.

In various embodiments, pumping system 120 further includes a batch controller 224. Batch controller 224 may be the user interface of the pumping system 120. Batch controller 224 may present output to the user and receive input from the user. In this regard, batch controller 224 may include a display 232 and an input device 234. Examples of input devices 234 include, but are not limited to: computer mice, trackpads, keyboards, touch screens, or one or more sensors. Batch controller 224 may include one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the batch controller 224 controls, at least various parts of, and operation of various components of, the pumping system 120. For example, the batch controller 224 may control operation of metering device 226. Batch controller 224 may further control operation of printer 228.

In various embodiments, pumping system 120 further includes metering device 226. Metering device 226 may comprise a liquid flow meter configured to measure a flow rate of a liquid moving through a conduit 240 from totes 190. In various embodiments, metering device 226 is an in-line liquid flow meter having flanged end fittings for coupling the metering device 226 to conduit 240. Metering device 226 may be in electronic communication with batch controller 224. Metering device 226 may output a voltage signal 227 corresponding to the volumetric flow rate of liquid moving through the metering device 226, and correspondingly, the conduit 240. The voltage signal 227 may be received by the batch controller 224 for monitoring the volume of liquid displaced from totes 190. In various embodiments, during operation, metering device 226 may generate a magnetic field. The flow of conductive liquid through this magnetic field may cause the metering device to generate voltage signal 227 which varies based upon the flow rate of the liquid.

In various embodiments, pumping system 120 further includes a printer 228. Printer 228 may be in electronic communication with batch controller 224. Printer 228 may be configured to print a summary or report of the delivered liquid based upon, among other things, the voltage signal 227. For example, printer 228 may receive a print signal 229 (e.g., a voltage signal, a current signal, or an electromagnetic wireless signal) from batch controller 224, instructing the printer 228 to print a report, such as a receipt or invoice for example, indicative of a volume of liquid dispensed via pumping system 120. Printer 228 may be configured to print a summary or report of the delivered liquid in response to user input via input device 234.

Pumping system 120 may further include a power converter 216. Power converter 216 may comprise hardware and/or software that is configured to receive direct current (DC) voltage from trailer auxiliary power line 114, condition the DC voltage, and deliver the conditioned DC voltage to one or more pumping system components. In various embodiments, power converter 216 comprises a DC to DC voltage converter configured to adjust (e.g., step up and/or step down) the voltage of the power signal of trailer auxiliary power line 114 to a voltage suitable for batch controller 224, metering device 226, printer 228, and/or pump 222. In various embodiments, power converter 216 converts a voltage signal of about 24 volts received by trailer auxiliary power line 114 to a voltage signal of about 12 volts for powering batch controller 224, metering device 226, printer 228, and/or pump 222. In this regard, batch controller 224, metering device 226, printer 228, and pump 222 are all powered by a power source located on-board the tractor-trailer. In this regard, pumping system 120 does not require an external power source located off-board the tractor-trailer for operating any component of pumping system 120.

In various embodiments, conduit 240 is mounted to housing 251. A first end 241 (also referred to herein as an inlet end) of conduit 240 may be accessible from outside of housing 251 for readily attaching additional conduit thereto. Similarly, a second end 242 (also referred to herein as an outlet end) of conduit 240 may be accessible from outside of housing 251 for readily attaching additional conduit thereto. Conduit 240 may comprise a metal pipe or tube. Conduit 240 may comprise any suitable diameter depending on desired flow characteristics and packaging of the conduit 240, among other considerations. For example, and without limiting the disclosure, conduit 240 may comprise an inside diameter of between ½" and 4" (1.27-10.16 cm). In various embodiments, first end 241 and second end 242 are sealed to housing 251 to minimize contaminants entering housing 251.

Figure 3:
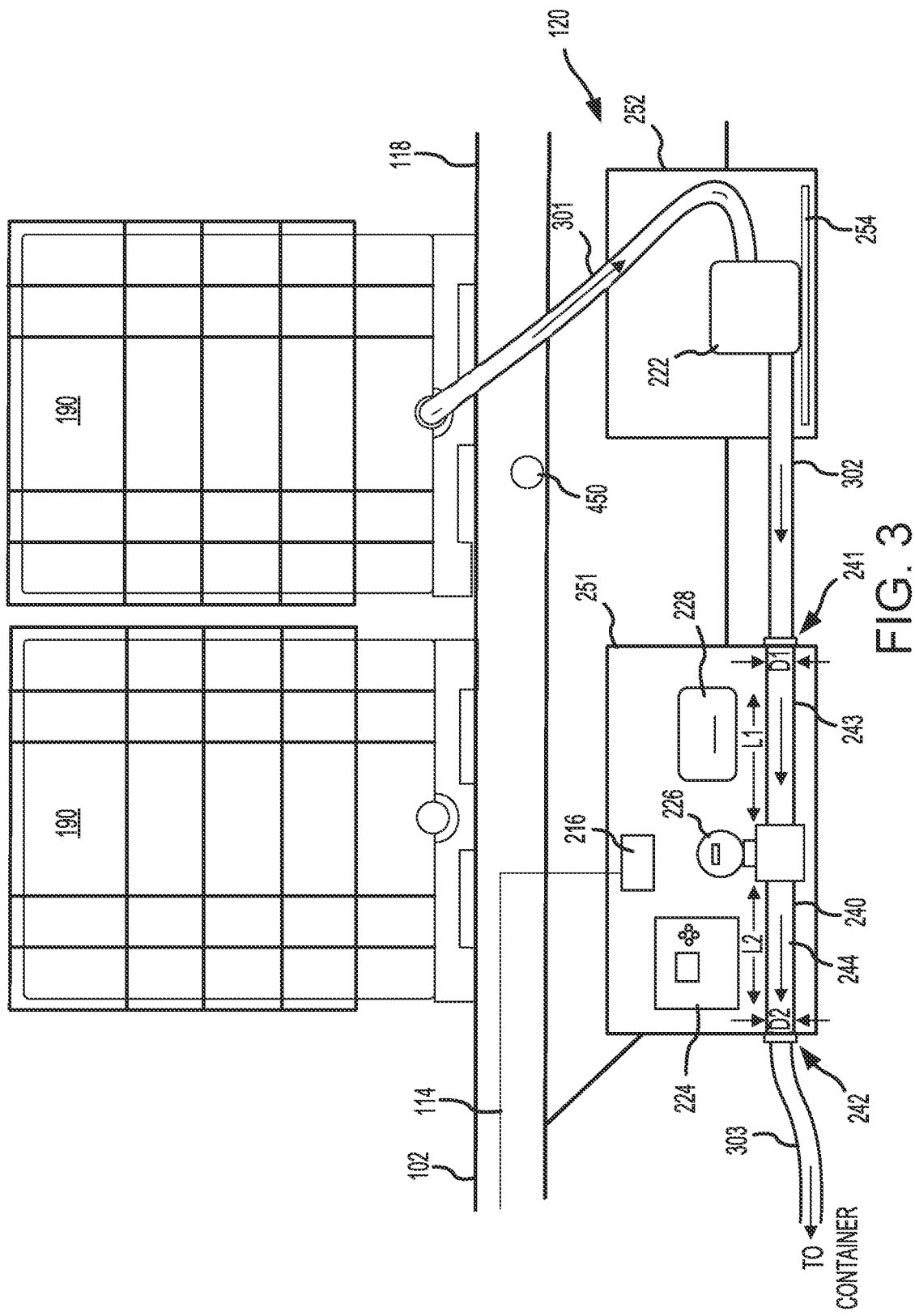
FIG. 3 illustrates the trailer-mounted pumping system of FIG. 2 during operation of the pumping system, in accordance with various embodiments.

With reference now to FIG. 3, in various embodiments, conduit 240 comprises a first portion 243 disposed immediately upstream from metering device 226. First portion 243 may be a straight conduit comprising a length L1 which is greater than or equal to about five times, the inner diameter (5*D1) of first portion 243. In various embodiments, conduit 240 comprises a second portion 244 disposed immediately downstream from metering device 226. Second portion 244 may be a straight conduit comprising a length L2 which is greater than or equal to about two times the inner diameter (2*D2) of second portion 244. By providing a straight conduit immediately upstream and downstream from metering device 226, it is believed that the accuracy of metering device 226 can be maximized.

With respect to FIG. 3, elements with like element numbering, as depicted in FIG. 2, are intended to be the same and will not necessarily be repeated for the sake of clarity.

With additional reference to FIG. 3, when delivering a liquid, pump 222 pumps the liquid from one of the totes 190 into a container located off-board the tractor-trailer. After arrival to a delivery sight, a first hose or conduit 301 may be coupled between the pump 222 and a tote 190. A second hose or conduit 302 may be coupled between the pump 222 and first end 241 of conduit 240. A third hose or conduit 303 may be coupled between the second end 242 of conduit 240 and an off-board container to which the liquid is being delivered. With the hoses attached, the pumping system 120 is ready to deliver a liquid from the totes 190 to an off-board container. In various embodiments, the conduits (e.g., conduit 301, conduit 302, conduit 303, and/or conduit 240) can be rigid, while in other embodiments, the conduits can be flexible. It is contemplated herein that a hose reel (e.g., manual, automatic, or electric), with conduit 303 mounted thereon, may be attached to second end 242. A hose reel may facilitate the manipulation and storage of conduit 303.

To initiate the pumping system 120, a user may indicate to batch controller 224—e.g., via input device 234—to initiate a batch of liquid. After the batch is initiated, batch controller 224 may begin to measure the volume of liquid flowing through conduit 240 via metering device 226. The user starts pump 222 which begins to move or pump liquid from tote 190, through the pump 222, through conduit 240 and metering device 226, and off trailer 102 into an off-board container. After a desired quantity of the liquid has been delivered, the user may indicate to the batch controller 224 to end the batch. The user may further indicate to the batch controller 224 to print a report of the batch, in response to which the batch controller 224 sends the print signal 229 to printer 228 to print a report of the volume of liquid dispensed in one or more batches.

In response to a first tote being emptied, a user may idle down, or power off, pump 222 and disconnect the inlet end of conduit 301 from the first tote and connect the inlet end of conduit 301 to a second tote. The pump 222 may then be idled up, or powered on, to continue pumping the liquid to complete the delivery of that batch. Furthermore, conduit 301 may be configured to include a plurality of inlets in fluid communication with a single outlet, whereby two or more totes 190 are simultaneously coupled in fluid communication with pump 222 for simultaneously dispensing liquids from a plurality of totes 190. Simultaneous dispensing of liquids from a plurality of totes 190 may be particularly useful when the plurality of totes 190 contain the same type of liquid. In various embodiments, conduit 301, conduit 302, and/or conduit 303 may be stored on-board trailer 102, such as in housing 252 or another housing mounted to trailer 102 for example, in between deliveries.

In various embodiments, the conduits (e.g., conduit 301, conduit 302, conduit 303, and/or conduit 240) may be emptied at the end of a delivery, or in between delivery of different materials, by attaching a vehicle-mounted air system (e.g., an on-board air compressor) to the inlet end of conduit 301 and directing compressed air into the pumping system 120 to push the remaining liquid material through the pumping system 120 and into the off-board container.

In various embodiments, pumping system 120 comprises housing 251 (also referred to herein as a first housing) and housing 252 (also referred to herein as a second housing). Housing 251 and housing 252 may be mounted to trailer 102 at a location beneath the deck surface 118. Batch controller 224, metering device 226, printer 228, and power converter 216 may be disposed within housing 251. Pump 222 may be separately stored within housing 252. Storing the pump 222 in a separate housing may allow for increased ease of removing, repairing, and/or replacing the pump 222. Furthermore, by storing pump 222 in housing 252, any liquid that may leak from pump 222 may be isolated from other components of pumping system 120. In this regard, housing 251 and/or housing 252 can be liquid-proof, fully-enclosed or otherwise provide the contents with protection from the environment (e.g., temperature, light, moisture, wind, etc.). Furthermore, housing 252 may comprise a sliding tray 254 disposed therein. Pump 222 may be mounted to sliding tray 254, providing greater access to pump 222 for starting, maintenance, repairs, and/or refueling of pump 222. Having described the pumping system 120 as being housed in two separate housings, it is contemplated herein that various embodiments may include pumping system 120 stored in a single housing. Furthermore, it is contemplated that three or more housings may be used to store pumping system 120. For example, a third housing may be provided for separately storing electronic components, in accordance with various embodiments.

Figure 4:
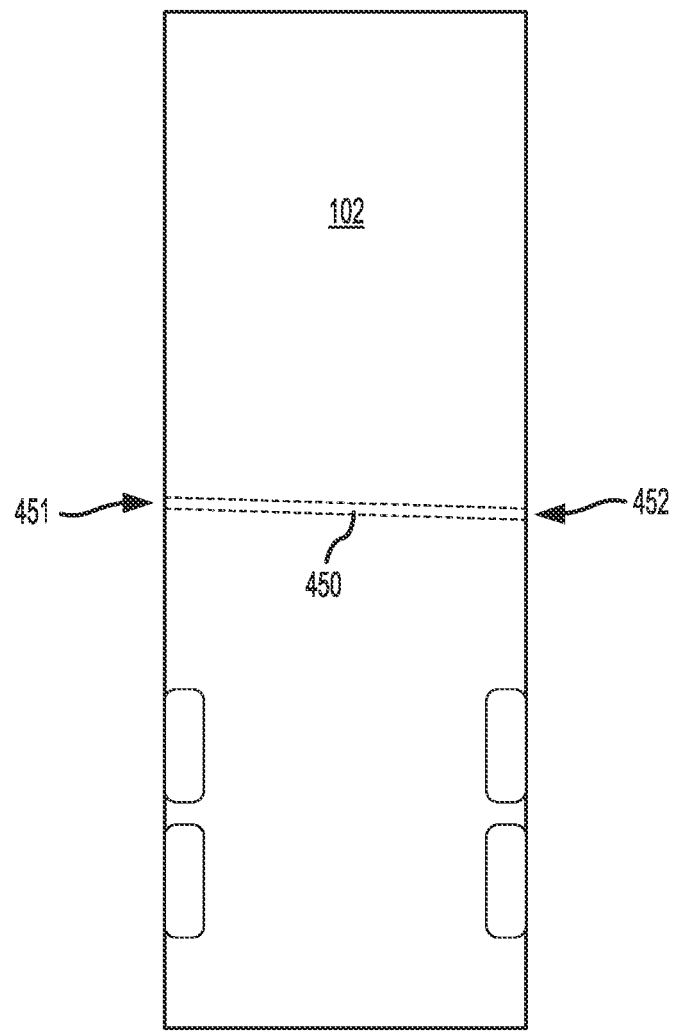
FIG. 4 illustrates a plan view of a cross-over pipe for a trailer-mounted pumping system, in accordance with various embodiment.

In various embodiments, a cross-over pipe 450 may be mounted to trailer 102 to provide a conduit through which pump 222 may be connected to totes 190 on either side (driver or passenger) of trailer 102. With reference to FIG. 4, a plan view of cross-over pipe 450 mounted to trailer 102 is illustrated, in accordance with various embodiments. With combined reference to FIG. 3 and FIG. 4, in response to pumping system 120 being mounted to a driver's side of the trailer 102, conduit 301 may be coupled to first end 451 of cross-over pipe 450 and a tote may be coupled, via an additional conduit, to the second end 452 of cross-over pipe 450 to maximize ease of coupling totes on the passenger side of trailer 102 to pump 222. Conversely, in response to pumping system 120 being mounted to a passenger's side of the trailer 102, conduit 301 may be coupled to second end 452 of cross-over pipe 450 and a tote may be coupled, via an additional conduit, to the first end 451 of cross-over pipe 450 to maximize ease of coupling totes on the passenger side of trailer 102 to pump 222. The cross-over pipe 450 may extend transversely across the trailer 102 to provide a fluid path between a first side (e.g., the driver's side) of the trailer and a second side (e.g., the passenger's side) of the trailer. The cross-over pipe 450 may be mounted above pump 222 to prevent liquid from spilling from conduit 301 when switching between totes 190.

Figure 5:
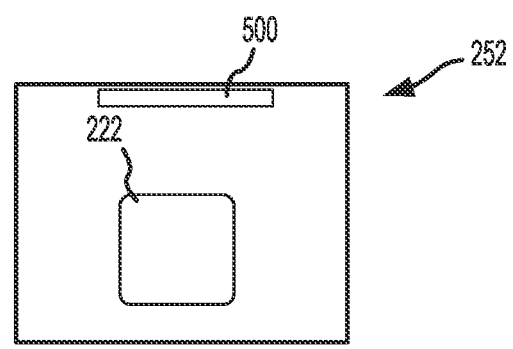
FIG. 5 illustrates a schematic view of a heated housing for a pump of a trailer-mounted pumping system.

In various embodiments, and with reference to FIG. 5, a heating element 500 may be mounted in housing 252 for cold weather applications. Heating element 500 may be configured to radiate thermal energy to pump 222 to prevent pump 222, including any liquids contained therein, from freezing. Heating element 500 may be powered via trailer auxiliary power line 114 (see FIG. 2). In various embodiments, heating element 500 is a resistive heater which converts electrical energy into heat through the process of Joule heating. While not illustrated, persons skilled in the art will appreciate that, in various embodiments, a heating element 500 may similarly be mounted in housing 251 for cold weather applications.

Figure 6:
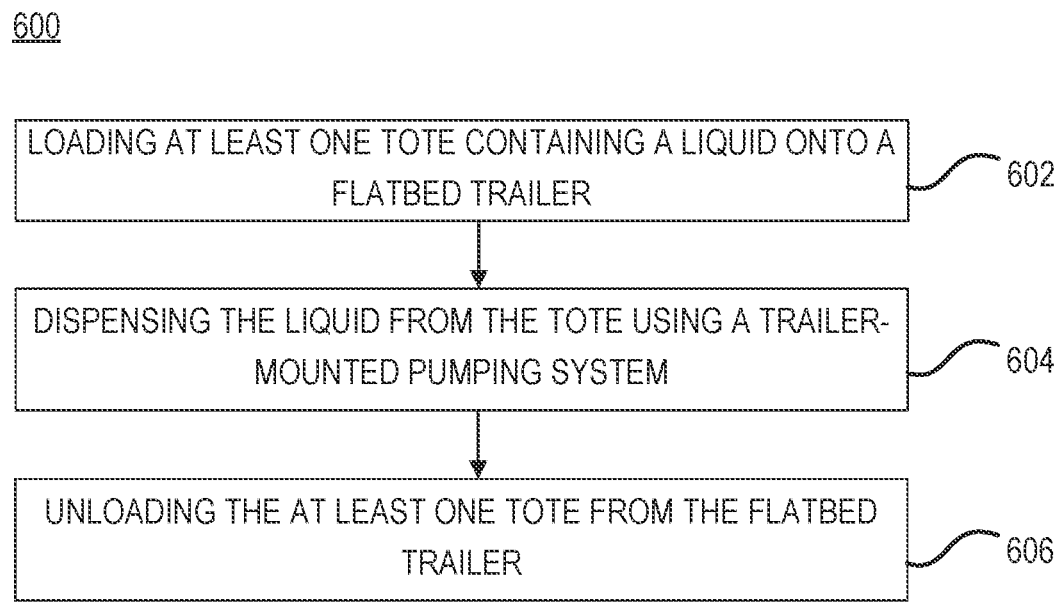
FIG. 6 illustrates a flow chart for a method for delivering a liquid, in accordance with various embodiments.

With reference to FIG. 6, a method 600 for delivering a liquid is provided, in accordance with various embodiments. Method 600 includes loading at least one tote containing a liquid onto a flatbed trailer (step 602). Method 600 includes dispensing the liquid from the tote using a trailer-mounted pumping system (step 604). Method 600 includes, after the liquid is delivered, unloading the at least one tote from the flatbed trailer (step 606).

With combined reference to FIG. 3 and FIG. 6, step 602 may include loading one or more totes 190 containing a liquid onto trailer 102. Totes 190 may be loaded using a forklift, for example. Step 604 may include dispensing the liquid from the tote(s) 190 using a trailer-mounted pumping system 120. In various embodiments, step 604 includes sub-steps including connecting first conduit 301 between a tote 190 and the pump 222, connecting second conduit 302 between the pump 222 and the metering device 226, and connecting third conduit 303 between metering device 226 and an off-board container. In various embodiments, step 604 further includes sub-steps of initiating batch controller 224 and starting pump 222. In various embodiments, step 604 further includes the sub-step of printing a report of the volume of the liquid via printer 228. Step 606 may include unloading one or more totes 190, for example using a forklift.

Benefits and other advantages have been described herein with regard to specific embodiments. Furthermore, the connecting lines shown in the various figures contained herein are intended to represent example functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B. or C" or "at least one of A, B, and C" is used in the claims, it is intended that the phrase be interpreted to mean that A alone may be present in an embodiment, B alone may be present in an embodiment, C alone may be present in an embodiment, or that any combination of the elements A. B and C may be present in a single embodiment; for example, A and B, A and C. B and C. or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A trailer-mounted pumping system, comprising:
   a flatbed trailer having a generally flat deck surface;
   a pump;
   a batch controller;
   a metering device in electronic communication with the batch controller;
   a power converter configured to supply electric power to the batch controller and the metering device;
   a first housing mounted beneath the deck surface; and
   a second housing mounted beneath the deck surface,
     wherein the pump is disposed in the second housing,
     wherein the pump is configured to move a liquid from at least one tote supported by the generally flat deck surface to a location off-board the flatbed trailer, and
     wherein the batch controller is configured to measure a volume of the liquid via the metering device.

2. The trailer-mounted pumping system of claim 1, wherein at least one of the pump, the batch controller, and the metering device is disposed beneath the generally flat deck surface.

3. The trailer-mounted pumping system of claim 1, wherein the batch controller is disposed in the first housing and the metering device is disposed in the second housing.

4. The trailer-mounted pumping system of claim 1, wherein the power converter receives the electric power from a trailer auxiliary power line.

5. The trailer-mounted pumping system of claim 4, wherein the power converter is disposed in the first housing.

6. A trailer-mounted pumping system, comprising:
   a flatbed trailer having a generally flat deck surface;
   a pump;
   a batch controller;
   a metering device in electronic communication with the batch controller;
   a first housing mounted beneath the deck surface;
   a second housing mounted beneath the deck surface; and
   a printer in electronic communication with the batch controller,
     wherein the pump is disposed in the second housing,
     wherein the pump is configured to move a liquid from at least one tote supported by the generally flat deck surface to a location off-board the flatbed trailer, wherein the batch controller is configured to measure a volume of the liquid via the metering device, wherein the printer prints a report of the volume of the liquid, and wherein the printer is disposed in the first housing.

7. The trailer-mounted pumping system of claim 6, further comprising a heating element mounted to the second housing, wherein the heating element is configured to radiate thermal energy to the pump.

8. A trailer-mounted pumping system, comprising:

a flatbed trailer having a generally flat deck surface;

a pump;

a batch controller;

a metering device in electronic communication with the batch controller;

a cross-over pipe mounted to the flatbed trailer;

a first housing mounted beneath the deck surface; and a second housing mounted beneath the deck surface, wherein the pump is disposed in the second housing, wherein the pump is configured to move a liquid from at least one tote supported by the generally flat deck surface to a location off-board the flatbed trailer, and wherein the batch controller is configured to measure a volume of the liquid via the metering device, wherein the cross-over pipe extends transversely across the flatbed trailer to provide a fluid path between a first side of the flatbed trailer and a second side of the flatbed trailer, and wherein the cross-over pipe is coupled between the pump and the at least one tote.

9. A trailer-mounted pumping system, comprising:

a flatbed trailer having a generally flat deck surface;

a pump;

a batch controller;

a metering device in electronic communication with the batch controller;

a first conduit;

a first housing mounted beneath the deck surface; and a second housing mounted beneath the deck surface, wherein the pump is disposed in the second housing, wherein the pump is configured to move a liquid from at least one tote supported by the generally flat deck surface to a location off-board the flatbed trailer, wherein the batch controller is configured to measure a volume of the liquid via the metering device, and wherein the conduit is connected between the at least one tote and the pump.

* * * * *